(12) United States Patent
Emerick et al.

(10) Patent No.: US 9,671,273 B2
(45) Date of Patent: Jun. 6, 2017

(54) GRAIN MEASUREMENT APPARATUS

(71) Applicant: Juniper Systems, Inc., Logan, UT (US)

(72) Inventors: Matthew T. Emerick, Logan, UT (US); Steven L. Harris, Logan, UT (US)

(73) Assignee: JUNIPER SYSTEMS, INC., Logan, UT (US)

( * ) Notice: Subject to any disclaimer, the term of this patent is extended or adjusted under 35 U.S.C. 154(b) by 164 days.

(21) Appl. No.: 14/611,897

(22) Filed: Feb. 2, 2015

(65) Prior Publication Data

US 2015/0219488 A1    Aug. 6, 2015

Related U.S. Application Data

(60) Provisional application No. 61/936,027, filed on Feb. 5, 2014.

(51) Int. Cl.
*G01G 17/00* (2006.01)
*G01G 13/00* (2006.01)

(52) U.S. Cl.
CPC .......... *G01G 17/00* (2013.01); *G01G 13/003* (2013.01)

(58) Field of Classification Search
CPC .............................. G01G 13/003; G01G 17/00
See application file for complete search history.

(56) References Cited

U.S. PATENT DOCUMENTS

| | | | | |
|---|---|---|---|---|
| 4,480,706 A | * | 11/1984 | Rosenthal | G01G 13/006 177/245 |
| 5,092,819 A | * | 3/1992 | Schroeder | A01D 41/127 460/7 |
| 5,173,079 A | * | 12/1992 | Gerrish | A01D 41/1271 460/7 |
| 5,487,702 A | * | 1/1996 | Campbell | A01F 12/50 460/7 |
| 5,664,402 A | * | 9/1997 | Sandvik | A01F 12/00 53/384.1 |
| 5,751,421 A | * | 5/1998 | Wright | G01J 3/02 356/328 |
| 6,155,103 A | * | 12/2000 | Diekhans | A01D 41/127 460/114 |
| 6,313,414 B1 | | 11/2001 | Campbell | |

(Continued)

*Primary Examiner* — Natalie Huls
(74) *Attorney, Agent, or Firm* — Maschoff Brennan

(57) ABSTRACT

A measurement apparatus may include a holding hopper configured to receive a sample of granular material. The measurement apparatus may include a top barrier assembly coupled between the holding hopper and a sub-sample measurement chamber. The top barrier assembly may include a movable top barrier configured to be moved from a closed position to an open position to direct a sub-sample of granular material to flow from the holding hopper to the sub-sample measurement chamber. The measurement apparatus may include the sub-sample measurement chamber configured to couple to the holding hopper at a docked position to receive the sub-sample of granular material from the holding hopper. The measurement apparatus may include a separator actuator configured to separate the sub-sample measurement chamber from the holding hopper. The measurement apparatus may include one or more measurement sensors configured to measure one or more attributes of the sub-sample of granular material.

22 Claims, 12 Drawing Sheets

(56) References Cited

U.S. PATENT DOCUMENTS

| | | | |
|---|---|---|---|
| 8,082,809 B2 * | 12/2011 | Luellen | G01N 1/04 73/863.41 |
| 2006/0248943 A1 * | 11/2006 | Funk | G01N 27/223 73/32 R |
| 2007/0089389 A1 * | 4/2007 | Baumgarten | A01D 41/1276 56/10.2 A |
| 2007/0186530 A1 | 8/2007 | Meier et al. | |
| 2011/0137611 A1 * | 6/2011 | Campbell | G01G 19/083 702/173 |
| 2016/0066507 A1 * | 3/2016 | Inoue | A01B 79/005 460/59 |

\* cited by examiner

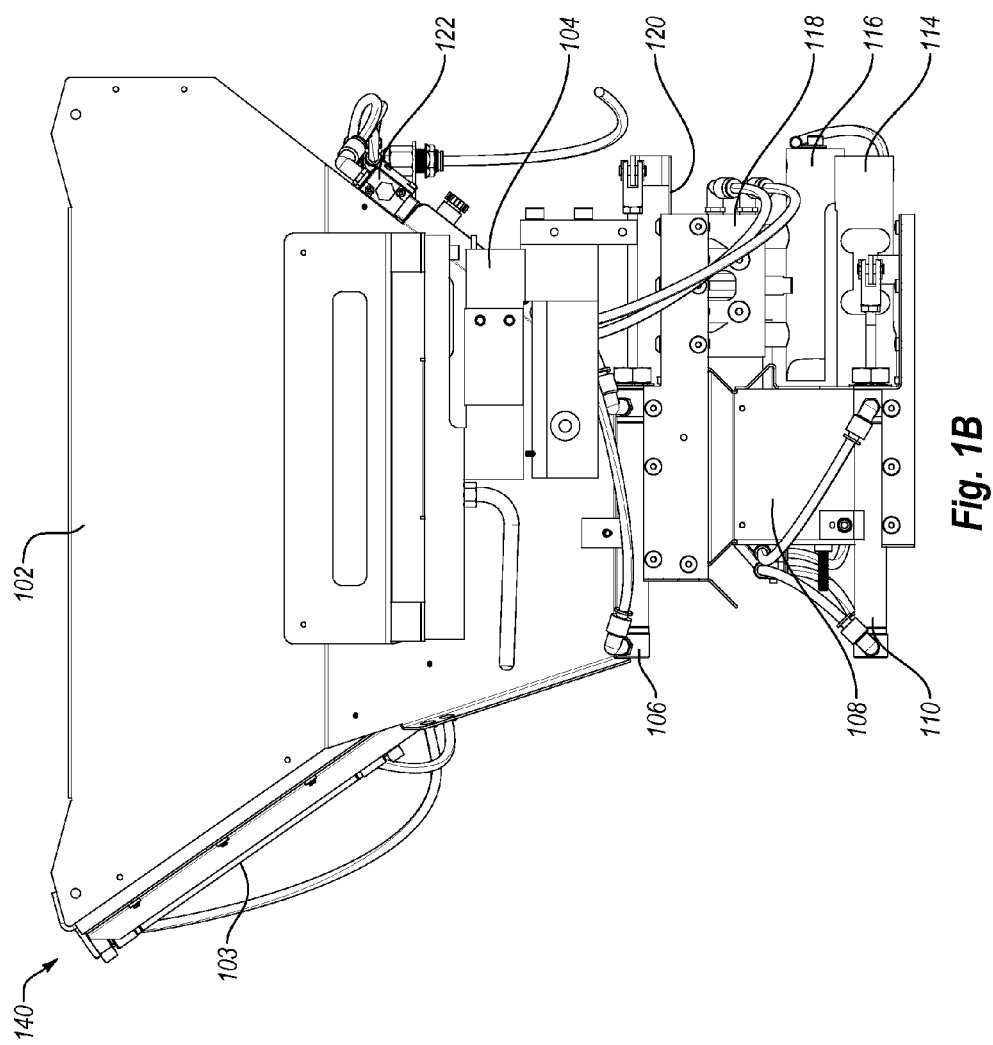

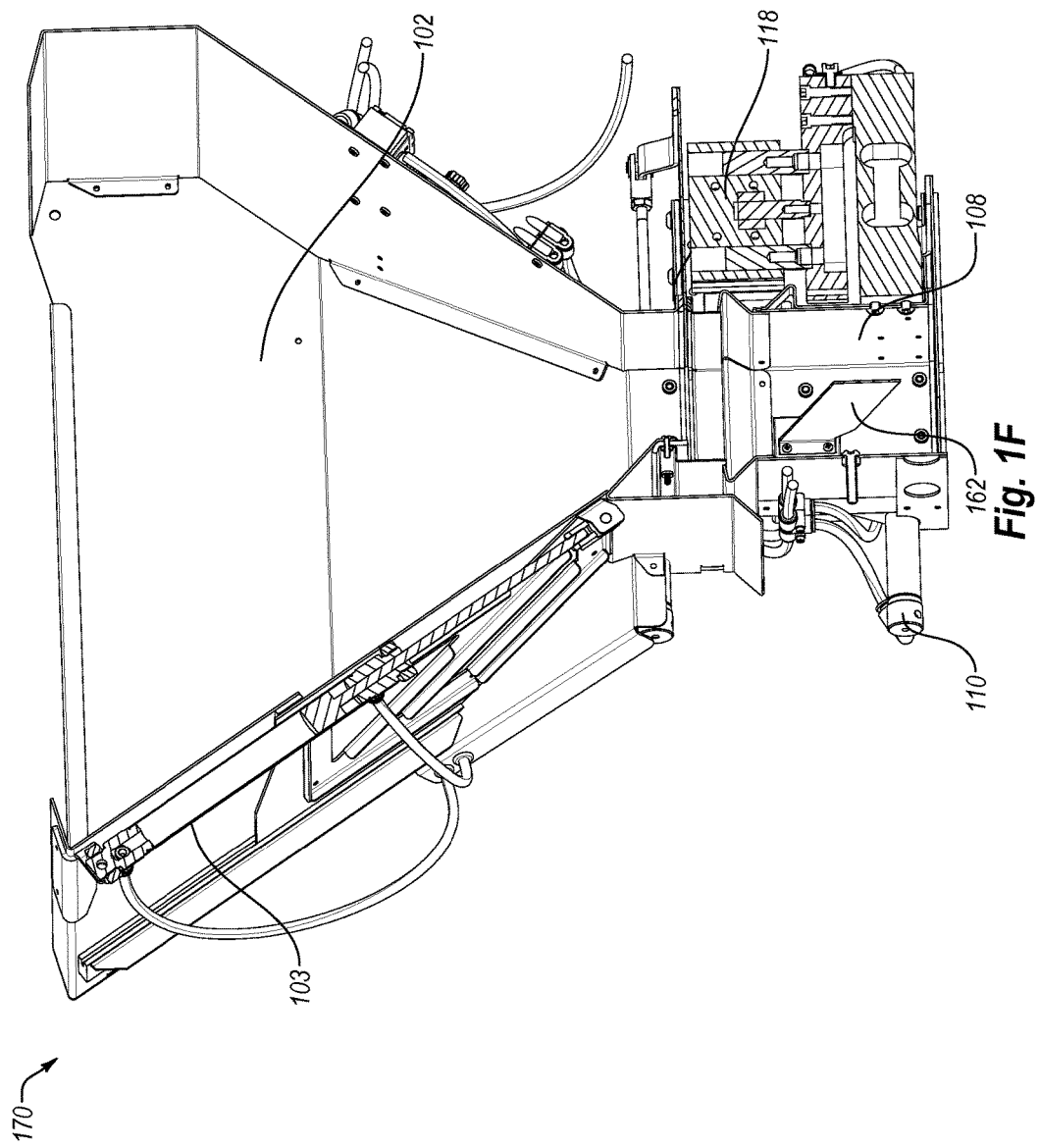

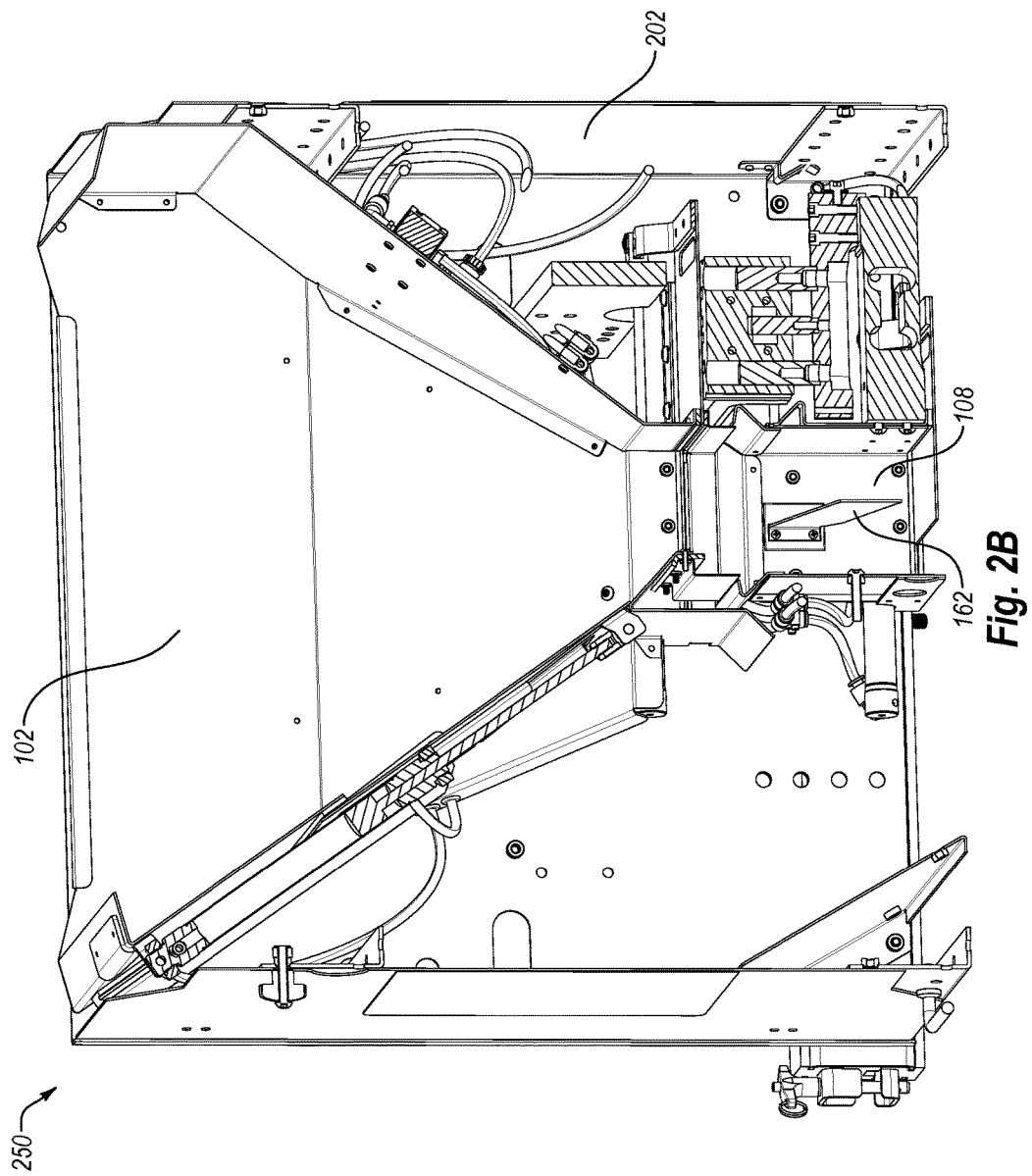

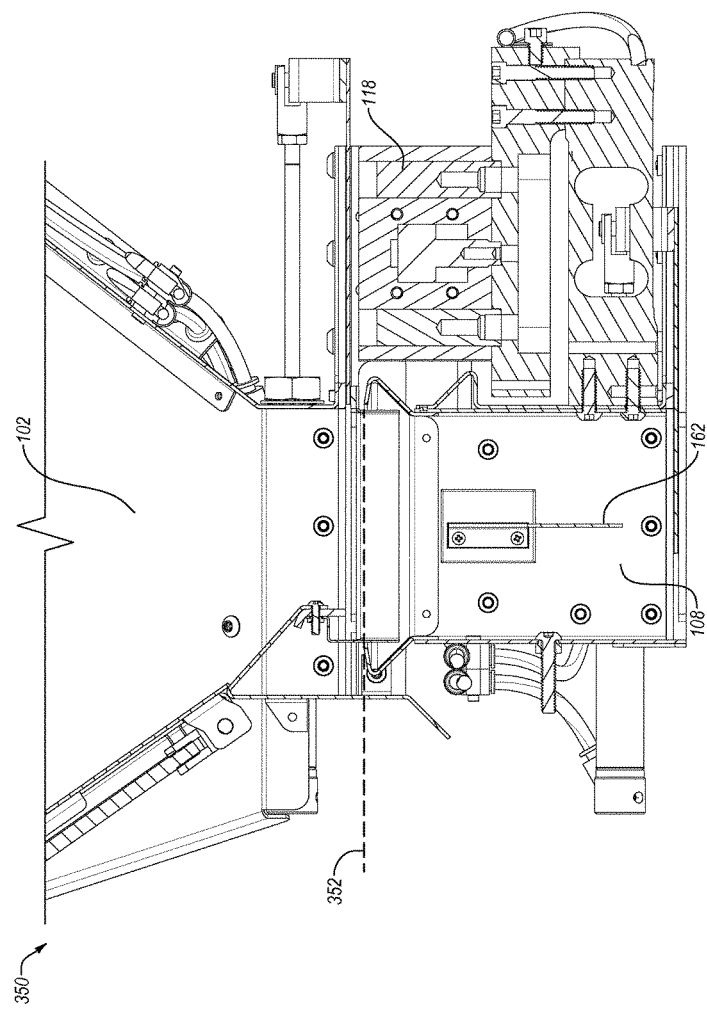

GRAIN MEASUREMENT APPARATUS

CROSS-REFERENCE TO RELATED APPLICATIONS

This application claims the benefit of priority of U.S. Provisional Application No. 61/936,027, entitled "Grain Measuring Apparatus" filed Feb. 5, 2014. The entirety of the foregoing application is incorporated herein by reference.

FIELD

Some embodiments described herein generally relate to technologies for measuring one or more attributes of granular material.

BACKGROUND

Unless otherwise indicated herein, the materials described herein are not prior art to the claims in the present application and are not admitted to be prior art by inclusion in this section.

The earliest automated electronic measurement systems for recording harvested crop weights and other information may date back to the mid 1970's. Previous to this (and in many cases even today), agronomy researchers captured threshed grain from plots in bags and transported samples to the laboratory for performing measurement and/or other analysis.

Historically, various models of on-combine grain measurement systems for research have been developed for grain plot weight measurement, moisture measurement, test weight measurement, and field measurements on research plots, with some compromise of measurement capability (e.g., accuracy, repeatability, and speed) due to the system design. For example, existing grain measurement systems may take a long time to perform a measurement. In another example, as in an existing double-bucket system, a measurement speed may be improved by processing two plots (e.g., a left plot, a right plot) simultaneously. However, the double-bucket system may require two independent sets of calibrations to correct measurement variation due to separate measurement systems and calibrations. For example, the double-bucket system may include two separate measurement systems for measuring the left plot and the right plot respectively, and sensors in the two separate measurement systems may be different. Therefore, calibrations for the sensors in the two separate measurement systems may be different.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY OF SOME EXAMPLE EMBODIMENTS

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

Some example embodiments described herein generally relate to technologies for measuring one or more attributes of granular material.

In an example embodiment, a measurement apparatus may include a holding hopper, a top barrier assembly, a sub-sample measurement chamber, a separator actuator, and one or more measurement sensors. The holding hopper may be configured to receive and hold a sample of granular material. The top barrier assembly may be coupled between the holding hopper and the sub-sample measurement chamber. The top barrier assembly may include a movable top barrier configured to be moved from a top barrier closed position to a top barrier open position to direct a sub-sample of granular material to flow from the holding hopper to the sub-sample measurement chamber. The sub-sample measurement chamber may be configured to couple to the holding hopper and the top barrier assembly at a docked position to receive the sub-sample of granular material from the holding hopper. The separator actuator may be configured to separate the sub-sample measurement chamber from the holding hopper and the barrier assembly. The one or more measurement sensors may be configured to measure one or more attributes of the sub-sample of granular material and generate one or more signals related to the one or more attributes of the sub-sample of granular material responsive to the sub-sample measurement chamber being separated from the holding hopper and the top barrier assembly.

In another example embodiment, a method of measuring samples of granular material may include accumulating a sample of granular material in a holding hopper. The method may include actuating a movable top barrier to move from a top barrier closed position to a top barrier open position to direct a first sub-sample of granular material to flow from the holding hopper into a sub-sample measurement chamber docked to the holding hopper. The method may additionally include actuating the top barrier to move from the top barrier open position to the top barrier closed position responsive to the first sub-sample of granular material having been accumulated in the sub-sample measurement chamber. The method may additionally include separating the sub-sample measurement chamber from the holding hopper and the top barrier. The method may additionally include measuring one or more attributes of the first sub-sample of granular material in the sub-sample measurement chamber while the sub-sample measurement chamber is separated from the holding hopper and the top barrier.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which:

FIG. 1B is a first side view of the example grain measurement apparatus of FIG. 1A;

FIG. 1F is another cross-sectional view of the example grain measurement apparatus of FIG. 1A;

FIG. 2B is a cross-sectional view of the example grain measurement apparatus of FIG. 1A placed in the example outer housing of FIG. 2A;

FIG. 3B is another partial cross-sectional view of the example grain measurement apparatus of FIG. 1A, where the sub-sample measurement chamber is docked to the holding hopper and the top barrier assembly;

DETAILED DESCRIPTION OF SOME EXAMPLE EMBODIMENTS

Figure 1A:
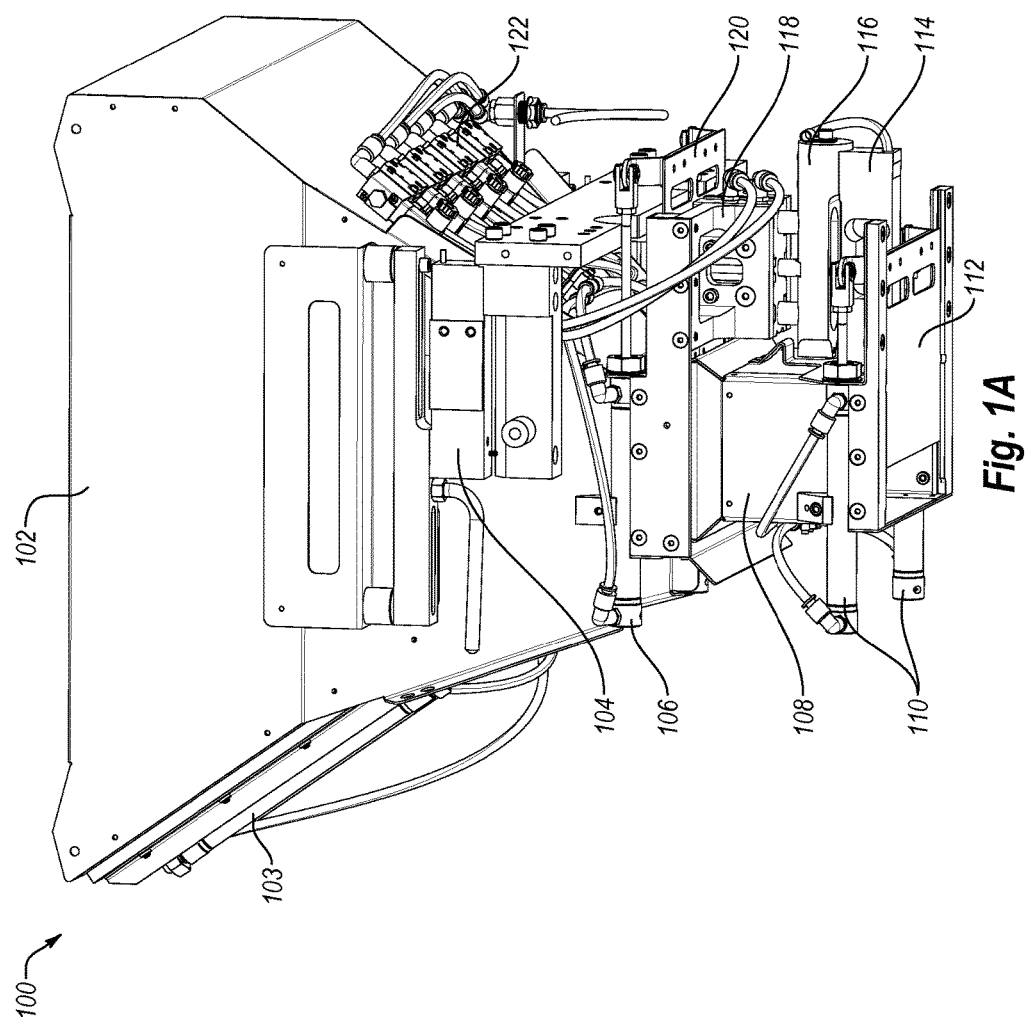
FIG. 1A is a perspective view of an example grain measurement apparatus configured to measure one or more attributes of granular material.

Embodiments described herein generally relate to technologies for measuring one or more attributes of granular material.

The granular material described herein may include grain (e.g., corns, wheat, beans), seeds, fruits, any other suitable agriculture produce, any other suitable bulk material, and/or some combination thereof. One or more attributes of the granular material may include, but are not limited to, a weight, a moisture level, a density, a protein level, a spectra, and any other suitable attributes of the granular material.

In some embodiments, a grain measurement apparatus described herein may include one or more measurement sensors and other grain handling hardware components combined together in a unique way to provide agricultural research data on small and/or large grain plot harvest in a quicker, more accurate, and more reliable way compared to existing technologies. In some embodiments, the grain measurement apparatus may include one or more of the following: (1) two weight measurement sensing sub-systems (e.g., a first sub-system for measuring a sample of granular material in a holding hopper, a second sub-system for measuring a sub-sample of granular material in a sub-sample measurement chamber); (2) a moisture sensor configured to measure a moisture level in the sub-sample of granular material in the sub-sample measurement chamber; (3) mechanical material flow handling components with actuators and controls; (4) an electronic control module or modules; (5) a signal processing module or modules for implementing signal processing algorithms; (6) user interfaces, system controls, databases, calibration and diagnostic software; and (7) any other suitable components for providing the functionality described herein.

The grain measurement apparatus described herein may alternately or additionally provide an additional set of attributes in terms of greater speed, accuracy, and reliability to the practice of measuring grain weight, density, moisture, and/or any other grain attributes on agronomy research plots. The grain measurement apparatus may use configurations of cantilevered strain gauge load cells or other suitable force measurement sensors to measure a plot weight, in a similar fashion as in products such as High Capacity Graingage™ from Juniper Systems, Inc. A related grain weighing and measuring system is described in U.S. Pat. No. 5,487,702, which is incorporated herein in its entirety by reference. The grain measurement apparatus described herein may take less time to perform a measurement and may produce a more accurate and reliable result than the grain weighing and measuring system described in U.S. Pat. No. 5,487,702.

Some embodiments described herein may include: (1) a uniform introduction of a sub-sample of granular material into a sub-sample measurement chamber from a holding hopper; (2) a momentary separation between the sub-sample measurement chamber and the holding hopper; (3) near-instantaneous weighing of the sub-sample of granular material with signal processing for cancellation of vibration, tilting, and/or machine motion effects to improve measurement accuracy; and (4) simultaneous measurement of weight, density, moisture, a protein level, and any other attributes for the sub-sample of granular material in the sub-sample measurement chamber and/or for the sample of granular material in the holding hopper. Simultaneous measurement of various attributes of the sub-sample of granular material and/or the sample of granular material may be achieved with a combination of efficiency, accuracy, speed, and robustness heretofore not possible on moving harvest machinery.

An example feature of the grain measurement apparatus described herein may include a utilization of two individual chambers that may include: (1) the holding hopper configured to receive and/or weigh a sample of granular material; and (2) the sub-sample measurement chamber disposed beneath the holding hopper. The sub-sample measurement chamber may be configured to receive a sub-sample of granular material directed from the holding hopper while the sub-sample measurement chamber is docked to the holding hopper. The sub-sample measurement chamber may be separated from the holding hopper and configured to measure the sub-sample of granular material while the sub-sample measurement chamber is separated from the holding hopper. The separation of the sub-sample measurement chamber from the holding hopper may reduce and/or eliminate interference caused by the holding hopper and/or the surrounding environment during a measurement of the sub-sample of granular material. Thus, measurement accuracy of the sub-sample of granular material in the sub-sample measurement chamber may be improved.

Compared to technologies that may include a movable holding hopper and a movable sub-sample chamber (e.g., a user may remove the holding hopper from a harvester and may pour granular material from the holding hopper to the sub-sample measurement chamber), implementations described herein with the single movable sub-sample measurement chamber disposed beneath the holding hopper may be more compact and more efficient with a faster processing speed. A minimal sample size needed by the implementations described herein may be smaller than that of the technologies that use a movable holding hopper and a movable sub-sample chamber with the sub-sample measurement chamber not disposed beneath the holding hopper.

Additional example features of the grain measurement apparatus described herein may include, but are not limited to: (1) capability of obtaining accurate weight measurements while the grain measurement apparatus is mounted on a dynamic platform such as a vibrating, moving, accelerating, and/or tilting harvester (e.g., a research harvester in normal motion modes); (2) a vertically-actuated separation mechanism configured to provide isolation between the holding hopper and the sub-sample measurement chamber momentarily to reduce and/or eliminate measurement interference so that a more accurate measurement may be achieved; (3) a uniform movement of granular material from the holding hopper into the sub-sample measurement chamber so that an accurate measurement may be obtained over varying field conditions (e.g., the uniform movement of the granular material may reduce or eliminate packing variability on the sub-sample of granular material to be measured, where packing variability may affect a density measurement of the sub-sample); (4) simultaneous measurement of various attributes of the granular material (e.g., a moisture level, a test weight, and a plot weight) to minimize a measurement time per plot; and (5) capability of correcting measurement errors caused by at least one of motion, tilting, vibration, acceleration, and/or deceleration of the dynamic platform.

The grain measurement apparatus described herein may be used in numerous applications. For example, the grain measurement apparatus may be used on research plot harvesters to measure grains with different sizes (e.g., wheat, corn, etc.) and/or any other suitable types of granular material or bulk material. Hundreds of thousands of research plots are harvested each year in every agricultural region of the world for the purpose of developing better crop varieties as well as evaluating efficacy of pesticides, herbicides, fertilizers, cultivation practices, irrigation practices, and so on. The grain measurement apparatus described herein may enable measurements with increased speed, accuracy, and reliability on a moving research harvester or other dynamic platforms. In another example, the grain measurement apparatus may be used in field laboratory situations, where the granular material may be hand harvested, threshed with a bundle thresher, and then measured through a stationary deployment of a system using technologies described herein. In one or more of these and/or other examples, more accurate and reliable measurement results may be obtained using the grain measurement apparatus described herein with a faster speed.

Different from a double-bucket system that may need two independent sets of calibrations for a left plot and a right plot to gain speed by processing the left plot and the right plot simultaneously, implementations described herein may only need a single set of calibrations and does not suffer from left-right variations in calibration.

Reference will now be made to the drawings to describe various aspects of some example embodiments of the invention. The drawings are diagrammatic and schematic representations of such example embodiments, and are not limiting of the present invention, nor are they necessarily drawn to scale.

FIG. 1A is a perspective view of an example grain measurement apparatus 100 configured to measure one or more attributes of granular material, arranged in accordance with at least some embodiments described herein. The grain measurement apparatus 100 may include a holding hopper 102, a bypass barrier assembly that includes a bypass barrier actuator 103 and a bypass barrier 152 (not shown in FIG. 1A but illustrated in FIG. 1D), one or more hopper force measurement sensors 104, a top barrier assembly that includes a top barrier actuator 106 and a top barrier 120, a sub-sample measurement chamber 108, a bottom barrier assembly that includes a bottom barrier actuator 110 and a bottom barrier 112, a chamber force measurement sensor 114, a sensor frame 116, a separator actuator 118, solenoid valves 122, and any other components suitable for a measurement apparatus.

Figure 4:
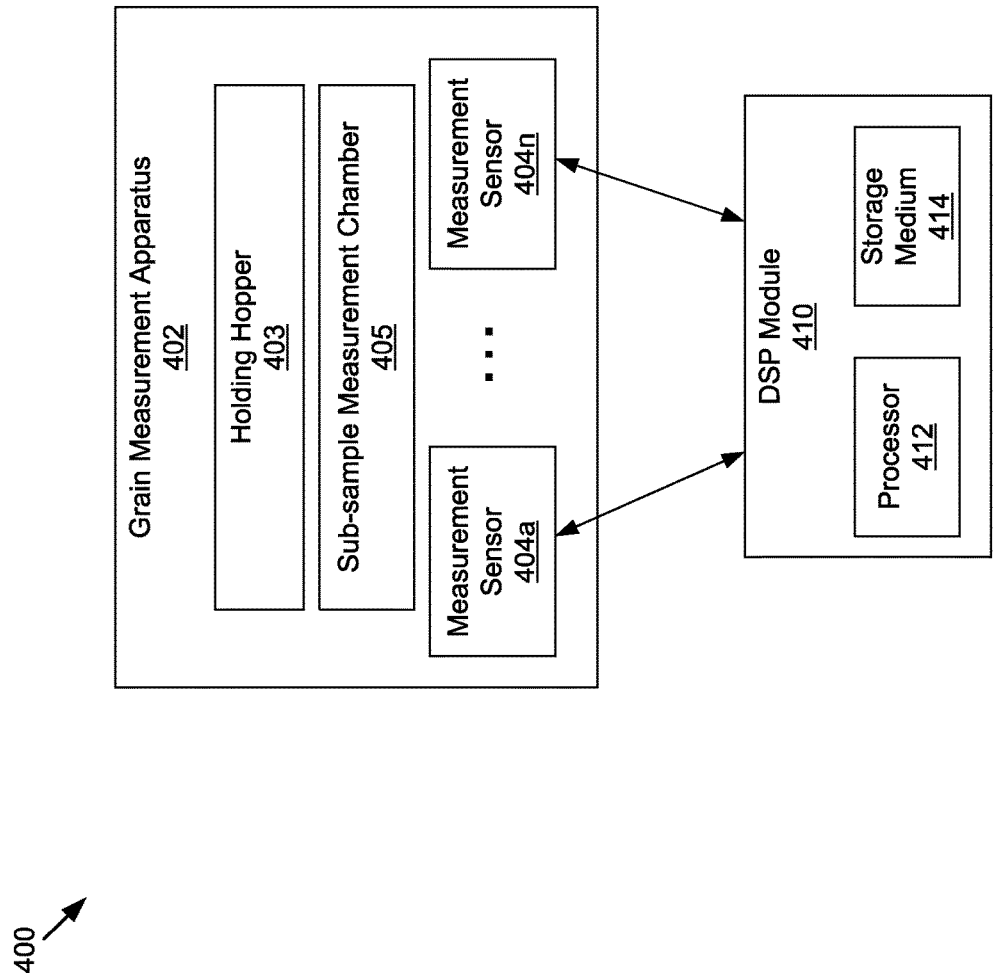
FIG. 4 is a block diagram of an operating environment that includes an example grain measurement apparatus and an example digital signal processing (DSP) module.

In some embodiments, the grain measurement apparatus 100 may include a digital signal processing (DSP) module (e.g., a DSP module 410 of FIG. 4). Alternatively, the grain measurement apparatus 100 may be communicatively coupled to an external DSP module. One or more measurement sensors of the grain measurement apparatus 100 (e.g., the hopper force measurement sensors 104, the chamber force measurement sensor 114, a moisture sensor, a level sensor, or another suitable sensor) may generate one or more signals in response to respective measurements of the granular material and may send the one or more signals to the DSP module for processing, as described below with reference to FIG. 4.

The holding hopper 102 may include a chamber configured to receive and hold a sample of granular material. The holding hopper 102 may include an entrance opening for receiving the sample of granular material from a harvester or any other suitable source. The holding hopper 102 may also include an exit opening through which a sub-sample of granular material may flow from the holding hopper 102 to the sub-sample measurement chamber 108 when the top barrier 120 is at a top barrier open position.

In some embodiments, the holding hopper 102 may include a level sensor within a chamber of the holding hopper 102. The level sensor may be configured to measure a level of granular material held in the holding hopper 102 to ensure that there is sufficient granular material in the holding hopper 102 for making an accurate measurement. In some embodiments, the level sensor may be used in applications where all granular material in the holding hopper 102 may be batched through the sub-sample measurement chamber 108 to determine variability of weight and moisture within a given plot sample. Alternatively, a weight read from the one or more hopper force measurement sensors 104 may be used to ensure that there is sufficient granular material in the holding hopper 102 for taking an accurate measurement.

The one or more hopper force measurement sensors 104 may be configured to measure a total weight of an overall assembly that includes the holding hopper 102, the sub-sample measurement chamber 108, and associated hardware components attached to the holding hopper 102 and/or the sub-sample measurement chamber 108. If the holding hopper 102 and the sub-sample measurement chamber 108 are empty (e.g., there is no granular material included in the overall assembly), the total weight of the overall assembly may include a total tare weight of the holding hopper 102, the sub-sample measurement chamber 108, and associated hardware components attached to the holding hopper 102 and/or the sub-sample measurement chamber 108. However, if the holding hopper 102 and/or the sub-sample measurement chamber 108 are not empty (e.g., there is granular material included in the overall assembly), the total weight of the overall assembly may include the total tare weight of the overall assembly and a weight of granular material held in the overall assembly. The one or more hopper force measurement sensors 104 may generate one or more signals related to and/or indicative of the total weight of the overall assembly. The one or more hopper force measurement sensors 104 may send the one or more signals to a DSP module coupled to the one or more hopper force measurement sensors 104. The one or more hopper force measurement sensors 104 may be configured to measure the total weight of the overall assembly regardless of the sub-sample measurement chamber 108 being docked to the holding hopper 102 or being separated (e.g., undocked) from the holding hopper 102.

As described below in more detail, a weight of the sample of granular material in the overall assembly may be obtained by subtracting the total tare weight of the overall assembly from the total weight of the overall assembly. Alternatively or additionally, a weight of granular material remaining in the holding hopper 102 may be obtained by subtracting from the total weight of the overall assembly: (1) the total tare weight of the overall assembly; and (2) a weight of granular material held in the sub-sample measurement chamber 108 if there is any.

In some embodiments, the holding hopper 102 may rest on a pair of hopper force measurement sensors 104 so that the total weight of the overall assembly may be obtained from signals generated by the pair of hopper force measurement sensors 104. The pair of hopper force measurement sensors 104 may be mounted on two opposite sides of the holding hopper 102, as best seen in FIG. 1D.

The one or more hopper force measurement sensors 104 may include any type of load cells (e.g., a parallelogram load cell, a strain gauge load cell, a cantilevered load cell, or any other types of load cells) and/or any other types of force measurement sensors.

The top barrier 120 may be disposed between the holding hopper 102 and the sub-sample measurement chamber 108. The top barrier 120 may be configured to move between a top barrier closed position and a top barrier open position by the top barrier actuator 106. When the top barrier 120 is at the top barrier closed position, a sample of granular material may be held in the holding hopper 102 and blocked from flowing into the sub-sample measurement chamber 108. Alternatively, when the top barrier 120 is at the top barrier open position, a sub-sample of granular material may flow from the holding hopper 102 into the sub-sample measurement chamber 108. In some embodiments, the top barrier 120 may include a movable gate capable of sliding between a closed position and an open position.

The top barrier actuator 106 may be mechanically and/or electrically coupled to the top barrier 120. The top barrier actuator 106 may be configured to actuate the top barrier 120 to move between the top barrier closed position and the top barrier open position. For example, the top barrier actuator 106 may be configured to actuate the top barrier 120 to move from the top barrier closed position to the top barrier open position responsive to an open triggering event so that a sub-sample of granular material may flow from the holding hopper 102 to the sub-sample measurement chamber 108.

The open triggering event may indicate that the holding hopper 102 may already include sufficient granular material for taking an accurate measurement. Example open triggering events may include, but are not limited to, a level of the granular material in the holding hopper 102 satisfying a level requirement (e.g., the level of the granular material being greater than or equal to a predetermined level), a weight of the holding hopper 102 satisfying a weight requirement (e.g., the weight of the holding hopper 102 being greater than or equal to a predetermined weight), and/or any other example triggering events. The level of the granular material in the holding hopper 102 may be measured by a level sensor placed within the holding hopper 102. The weight of the holding hopper 102 may be measured by the one or more hopper force measurement sensors 104 coupled to the holding hopper 102.

Alternatively or additionally, the top barrier actuator 106 may be configured to actuate the top barrier 120 to move from the top barrier open position to the top barrier closed position responsive to a close triggering event. Example close triggering events may include, but are not limited to, a level of the sub-sample of granular material in the sub-sample measurement chamber 108 satisfying a level requirement (e.g., the level of the granular material in the sub-sample measurement chamber being greater than or equal to a predetermined level), the sub-sample measurement chamber 108 being full of granular material, a weight of the sub-sample measurement chamber 108 satisfying a weight requirement, a measurement from a moisture sensor disposed within the sub-sample measurement chamber 108 satisfying a predetermined requirement, a time-out event (e.g., a predetermined period of time having elapsed), and/or any other suitable triggering events.

The sub-sample measurement chamber 108 may be disposed beneath the holding hopper 102. The sub-sample measurement chamber 108 may include an entrance opening for receiving the sub-sample of granular material from the holding hopper 102 and an exit opening through which the sub-sample of granular material may be evacuated from the sub-sample measurement chamber 108. The sub-sample measurement chamber 108 may be configured to receive the sub-sample of granular material from the holding hopper 102 via the entrance opening while the sub-sample measurement chamber 108 is docked to the holding hopper 102 and/or the top barrier assembly. The sub-sample measurement chamber 108 may temporarily hold the sub-sample of granular material. A volume of the sub-sample stored in the sub-sample measurement chamber 108 may be known or predetermined. One or more attributes of the sub-sample of granular material may be measured by one or more measurement sensors (e.g., the chamber force measurement sensor 114, a moisture sensor 162 of FIG. 1E, or another suitable sensor), when the sub-sample measurement chamber 108 is separated from the holding hopper 102 and/or the top barrier assembly.

The separator actuator 118 may be configured to separate the sub-sample measurement chamber 108 from the top barrier assembly and the holding hopper 102 responsive to a separation event so that one or more attributes of the sub-sample of granular material may be measured in an isolated environment. Example separation events may include, but are not limited to, a level of the sub-sample of granular material in the sub-sample measurement chamber 108 satisfying a level requirement (e.g., the level of the sub-sample of granular material being greater than or equal to a predetermined level, or the sub-sample measurement chamber 108 being full of granular material), the top barrier 120 being moved from the top barrier open position to the top barrier closed position, a particular period of time having elapsed, and any other suitable triggering events.

Alternatively or additionally, the separator actuator 118 may be configured to dock the sub-sample measurement chamber 108 back to the top barrier assembly and/or the holding hopper 102 responsive to a docking event. Example docking events may include, but are not limited to, the sub-sample of granular material having been evacuated from the sub-sample measurement chamber 108, the sub-sample measurement chamber 108 being ready to accept a new sub-sample of granular material, a particular period of time having elapsed, and any other suitable triggering events.

In some embodiments, when the separator actuator 118 docks the sub-sample measurement chamber 108 to the holding hopper 102 and the top barrier assembly and/or when the separator actuator 118 separates the sub-sample measurement chamber 108 from the holding hopper 102 and the top barrier assembly, the separator actuator 118 may also be configured to move the chamber force measurement sensor 114 and the sensor frame 116 together with the sub-sample measurement chamber 108.

The chamber force measurement sensor 114 may be coupled to the sub-sample measurement chamber 108. The chamber force measurement sensor 114 may measure a weight of the sub-sample measurement chamber 108 while the sub-sample measurement chamber 108 is separated from the holding hopper 102 and/or the top barrier assembly. The weight of the sub-sample measurement chamber 108 may be equal to a tare weight of the sub-sample measurement chamber 108 if the sub-sample measurement chamber 108 is empty. Alternatively, the weight of the sub-sample measurement chamber 108 may include the tare weight of the sub-sample measurement chamber 108 and a weight of granular material held in the sub-sample measurement chamber 108. The chamber force measurement sensor 114 may generate a signal related to and/or indicative of the weight of the sub-sample measurement chamber 108 and may send the signal to a DSP module coupled to the chamber force measurement sensor 114.

The chamber force measurement sensor 114 may include any type of load cells (e.g., a parallelogram load cell, a strain gauge load cell, a cantilevered load cell, or any other type of load cells) and/or any other type of force measurement sensors. The chamber force measurement sensor 114 may be the same as or similar to the hopper force measurement sensors 104. The sensor frame 116 may be configured to attach the chamber force measurement sensor 114 to the separator actuator 118.

The bottom barrier 112 may be disposed beneath the sub-sample measurement chamber 108. The bottom barrier 112 may be configured to move between a bottom barrier closed position and a bottom barrier open position by the bottom barrier actuator 110. When the bottom barrier 112 is at the bottom barrier closed position, the sub-sample of granular material may be held in the sub-sample measurement chamber 108. Alternatively, when the bottom barrier 112 is at the bottom barrier open position, the sub-sample of granular material may be evacuated from the sub-sample measurement chamber 108. In some embodiments, the bottom barrier 112 may include a movable gate capable of sliding between a closed position and an open position.

The bottom barrier actuator 110 may be mechanically and/or electrically coupled to the bottom barrier 112. The bottom barrier actuator 110 may be configured to actuate the bottom barrier 112 to move between the bottom barrier closed position and the bottom barrier open position. For example, the bottom barrier actuator 110 may be configured to actuate the bottom barrier 112 to move from the bottom barrier closed position to the bottom barrier open position responsive to an open triggering event so that the sub-sample of granular material may be evacuated from the sub-sample measurement chamber 108. Example open triggering events may include, but are not limited to, a completion of measurement of the sub-sample of granular material, a time-out event (e.g., a period of time having elapsed), and any other example triggering events.

In another example, the bottom barrier actuator 110 may be configured to actuate the bottom barrier 112 to move from the bottom barrier open position to the bottom barrier closed position responsive to a close triggering event. Example close triggering events may include, but are not limited to, a level of the sample of granular material in the holding hopper 102 satisfying a level requirement, a weight of the holding hopper 102 satisfying a weight requirement, a time-out event (e.g., a predetermined period of time having elapsed), a weight of the sub-sample measurement chamber 108 being approximately equal to its tare weight (e.g., the sub-sample measurement chamber 108 being empty), and any other suitable triggering events.

The solenoid valves 122 may include electrically-operated solenoid valves configured to drive the bypass barrier actuator 103, the top barrier actuator 106, the bottom barrier actuator 110, and/or the separator actuator 118. Although the actuators 103, 106, 110, and 118 are illustrated as pneumatic actuators, other types of actuators are possible in these and other embodiments.

Alternatively or additionally, the grain measurement apparatus 100 may include an acceleration measurement device configured to measure an acceleration related to a dynamic platform upon which the grain measurement apparatus 100 is mounted. In some embodiments, the acceleration measurement device may include one or more reference force measurement sensors each loaded with a known weight so that the acceleration may be calculated based on one or more signals generated by the one or more reference force measurement sensors. Example mechanisms for adjusting weight measurements using reference force measurement sensors are described in U.S. Pat. No. 6,313,414, titled "Slope and Motion Compensator for Weighing on a Dynamic Platform," which is incorporated herein in its entirety by reference. Alternatively or additionally, the acceleration measurement device may include an accelerometer configured to measure the acceleration.

The acceleration measured by the acceleration measurement device (e.g., acceleration sensors or similar measurement devices) may be used to correct measurement errors caused by movement, sloping, tilting, vibration, acceleration, and/or deceleration of the dynamic platform. Thus, accurate measurement may be generated even if the grain measurement apparatus 100 is mounted on a dynamic (e.g., moving, vibrating, and/or tilting) platform.

FIG. 1B is a first side view 140 of the example grain measurement apparatus 100 of FIG. 1A, arranged in accordance with at least some embodiments described herein. The first side view 140 illustrates the holding hopper 102, the bypass barrier actuator 103, the solenoid valves 122, one hopper force measurement sensor 104, the top barrier actuator 106, the top barrier 120, the sub-sample measurement chamber 108, the separator actuator 118, the sensor frame 116, the chamber force measurement sensor 114, the bottom barrier actuator 110, and other components of the grain measurement apparatus 100.

Figure 1C:
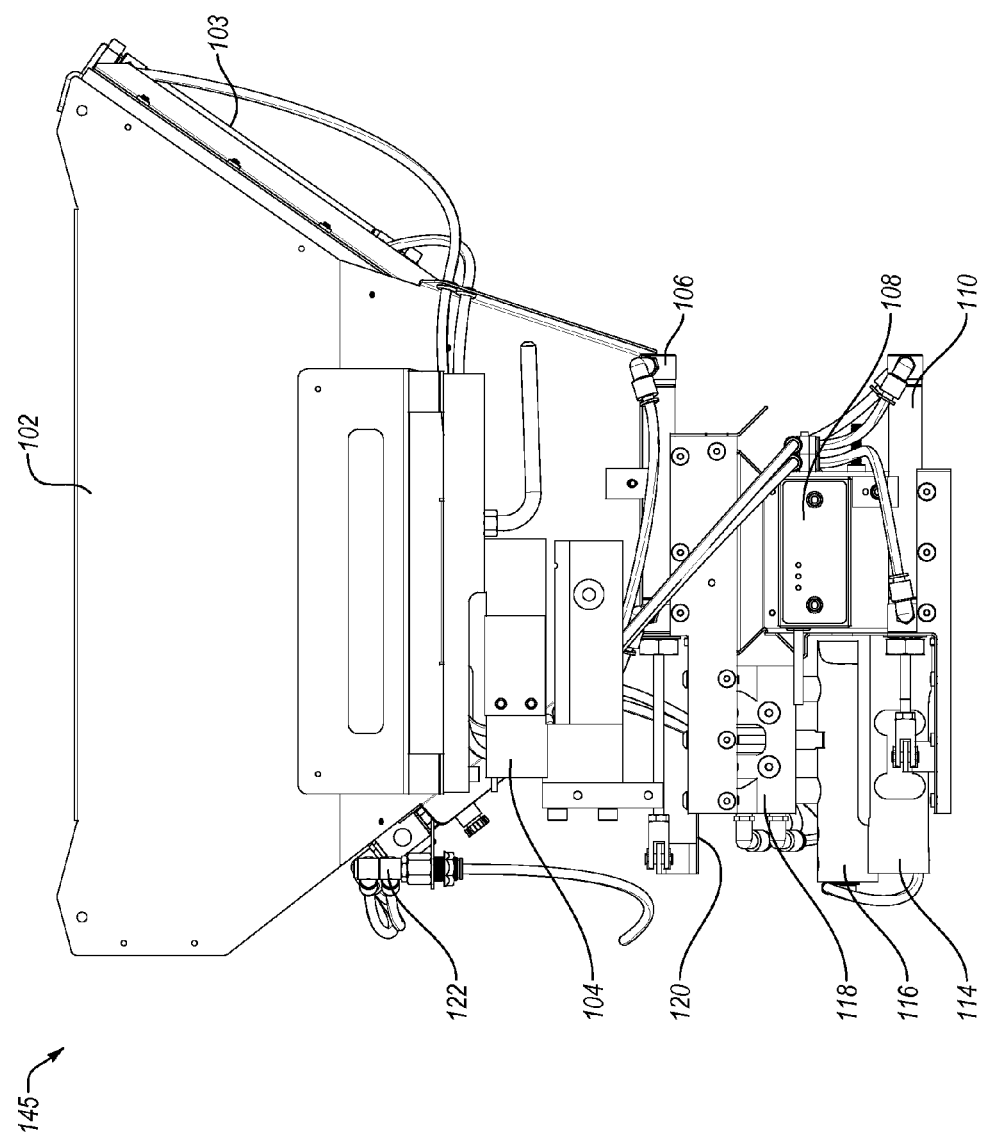
FIG. 1C is a second side view of the example grain measurement apparatus of FIG. 1A.
Figure 1D:
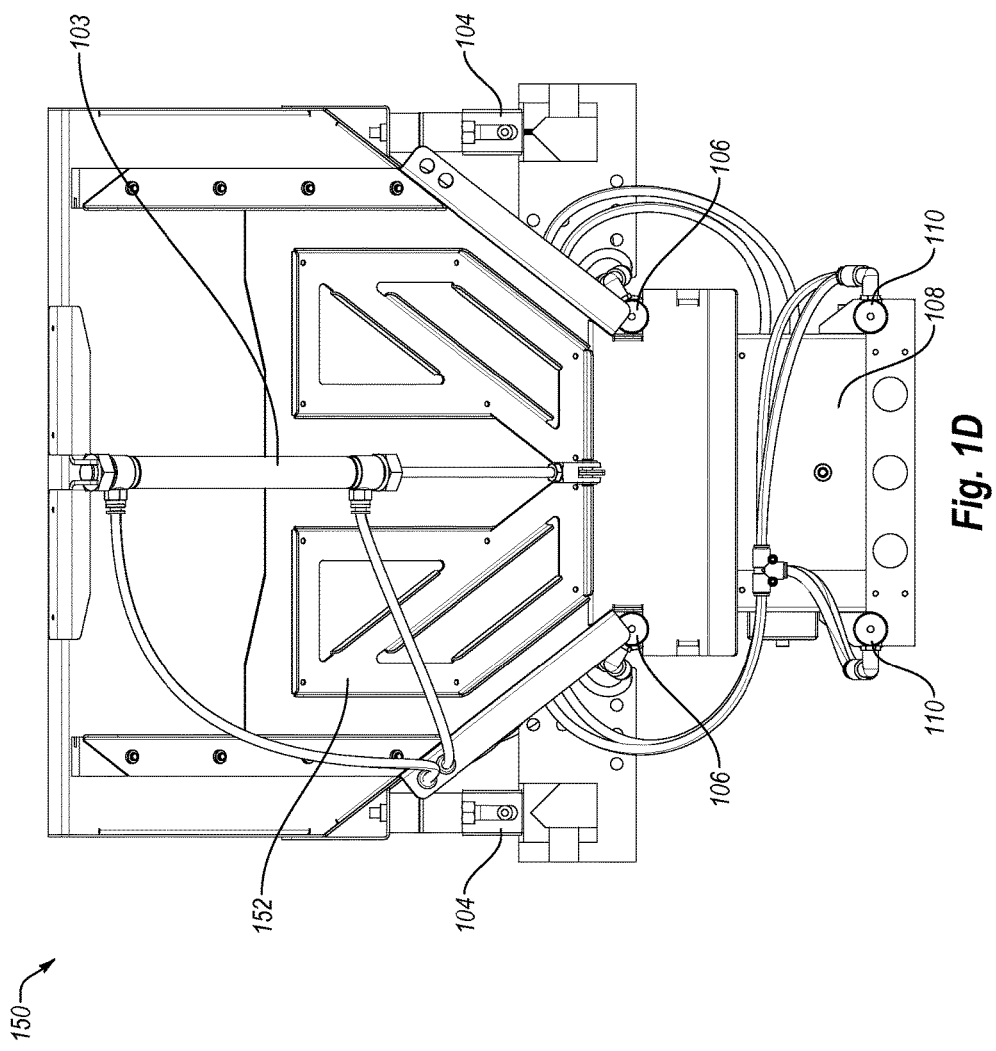
FIG. 1D is a third side view of the example grain measurement apparatus of FIG. 1A.

FIG. 1C is a second side view 145 of the example grain measurement apparatus 100 of FIG. 1A, arranged in accordance with at least some embodiments described herein. The second side view 145 illustrates the holding hopper 102, the bypass barrier actuator 103, the solenoid valves 122, another hopper force measurement sensor 104, the top barrier actuator 106, the top barrier 120, the sub-sample measurement chamber 108, the separator actuator 118, the sensor frame 116, the chamber force measurement sensor 114, the bottom barrier actuator 110, and other components of the grain measurement apparatus 100. The first side view 140 of FIG. 1B and the second side view 145 of FIG. 1C are viewed from two opposite sides of the grain measurement apparatus 100 of FIG. 1A.

FIG. 1D is a third side view 150 of the example grain measurement apparatus 100 of FIG. 1A, arranged in accordance with at least some embodiments described herein. The bypass barrier 152 may include a moving part of a wall of the holding hopper 102. The bypass barrier 152 may be configured to move between a bypass barrier closed position and a bypass barrier open position by the bypass barrier actuator 103. When the bypass barrier 152 is at the bypass barrier closed position as illustrated in FIG. 1D, a sample of granular material may be held in the holding hopper 102. Alternatively, when the bypass barrier 152 is at the bypass barrier open position (e.g., the bypass barrier 152 moves upward and/or outward from the bypass barrier closed position), the sample of granular material may be evacuated from the holding hopper 102. In some embodiments, the bypass barrier 152 may include a movable gate capable of sliding or turning between a closed position and an open position.

The bypass barrier actuator 103 may be mechanically and/or electrically coupled to the bypass barrier 152. The bypass barrier actuator 103 may be configured to actuate the bypass barrier 152 to move between the bypass barrier closed position and the bypass barrier open position. For example, the bypass barrier actuator 103 may be configured to actuate the bypass barrier 152 to move from the bypass barrier closed position to the bypass barrier open position responsive to an open triggering event so that the sample of granular material may be evacuated from the holding hopper 102. Example open triggering events may include, but are not limited to, a completion of measurement of the sub-sample of granular material in the sub-sample measurement chamber 108, a completion of a measurement of the sample of granular material in the holding hopper 102, a time-out event (e.g., a period of time having elapsed), and any other example triggering events.

Alternatively or additionally, the bypass barrier actuator 103 may be configured to actuate the bypass barrier 152 to move from the bypass barrier open position to the bypass barrier closed position responsive to a close triggering event. Example close triggering events may include, but are not limited to, the holding hopper 102 being ready to accept a new sample granular material, a certain period of time having elapsed, and any other suitable triggering events.

Figure 1E:
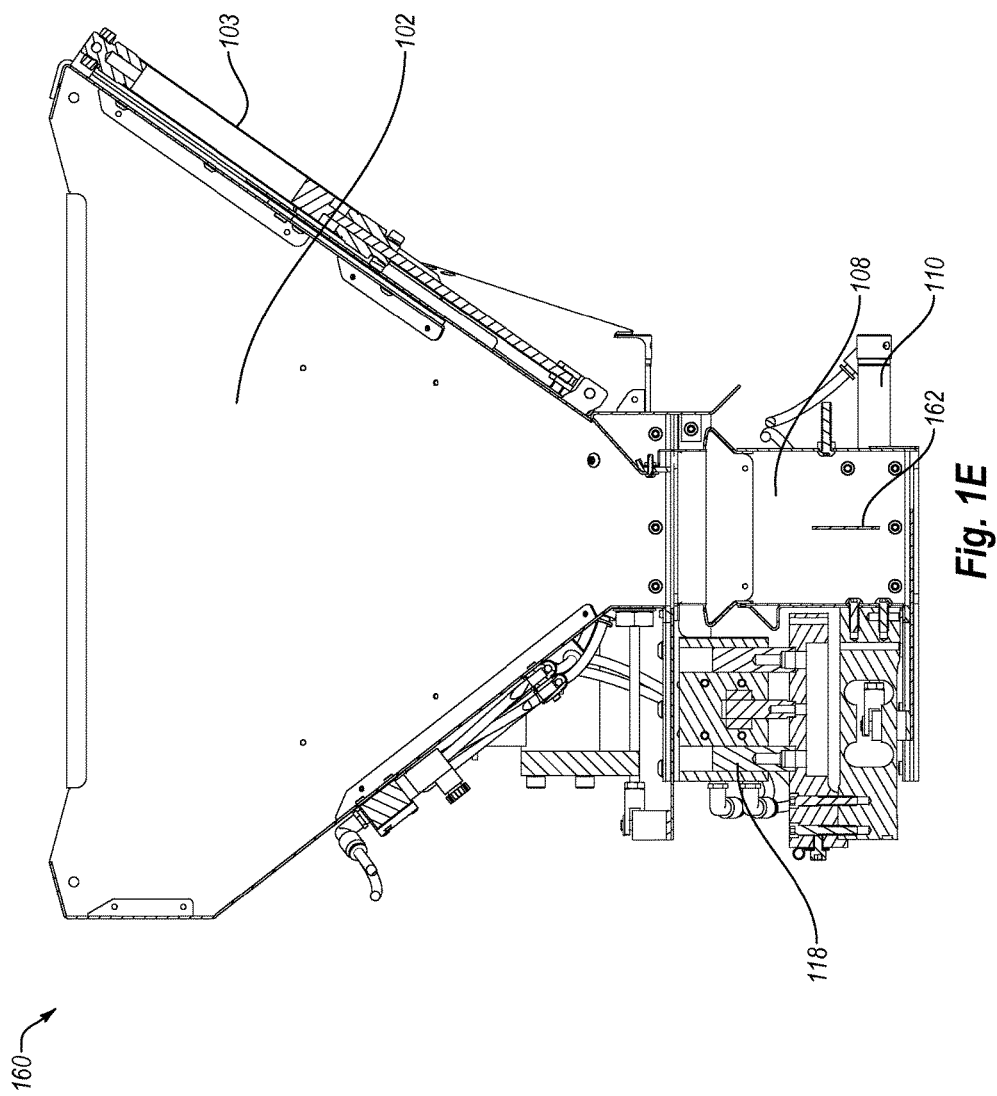
FIG. 1E is a cross-sectional view of the example grain measurement apparatus of FIG. 1A.

FIG. 1E is a cross-sectional view 160 of the example grain measurement apparatus 100 of FIG. 1A, arranged in accordance with at least some embodiments described herein. The cross-sectional view 160 illustrates the holding hopper 102, the bypass barrier actuator 103, the sub-sample measurement chamber 108, the separator actuator 118, the bottom barrier actuator 110, the moisture sensor 162, and other components of the grain measurement apparatus 100 of FIG. 1A. FIG. 1E illustrates the sub-sample measurement chamber 108 in an undocked position, e.g., separated from the top barrier assembly and the holding hopper 102.

The moisture sensor 162 may be disposed within the sub-sample measurement chamber 108. The moisture sensor 162 may include an electromagnetic sensor for measuring, for example, a complex electrical permittivity of the granular material in some embodiments. Alternatively, the moisture sensor 162 may include a near infrared radiation spectrometer (NIRS) configured to measure a moisture or protein level in the granular material. The moisture sensor 162 may be configured to measure a moisture level in the sub-sample of granular material and generate a signal related to and/or indicative of a measurement of the moisture level. The moisture sensor 162 may send the signal to a DSP module (e.g., the DSP module 410 of FIG. 4) for determining the moisture level in the sub-sample of granular material.

FIG. 1F is another cross-sectional view 170 of the example grain measurement apparatus of FIG. 1A, arranged in accordance with at least some embodiments described herein. The cross-sectional view 170 illustrates the holding hopper 102, the bypass barrier actuator 103, the sub-sample measurement chamber 108, the separator actuator 118, the bottom barrier actuator 110, the moisture sensor 162, and other components of the grain measurement apparatus 100 of FIG. 1A. FIG. 1F illustrates the sub-sample measurement chamber 108 in the undocked position, e.g., separated from the top barrier assembly and the holding hopper 102.

With combined reference to FIGS. 1A-1F, a grain measurement process performed by and/or controlled by the grain measurement apparatus 100 is described herein. Before the grain measurement process begins, all barriers (e.g., the bypass barrier 152 of FIG. 1D, the top barrier 120 and the bottom barrier 112 of FIG. 1A) may be closed and the sub-sample measurement chamber 108 may be empty. The sub-sample measurement chamber 108 may be docked to the holding hopper 102 and/or the top barrier assembly.

Initially, the grain measurement process may include accumulating granular material in the holding hopper 102. When sufficient granular material is accumulated in the holding hopper 102 (e.g., a weight of the granular material measured by the hopper force measurement sensors 104 is equal to or greater than a predetermined threshold, or a level of the granular material measured by a level sensor within the holding hopper 102 is equal to or greater than a predetermined level), the top barrier actuator 106 may actuate the top barrier 120 to move from the top barrier closed position to the top barrier open position. A sub-sample of granular material may flow from the holding hopper 102 to the sub-sample measurement chamber 108 being docked to the holding hopper 102 and/or the top barrier assembly.

The top barrier actuator 106 may actuate the top barrier 120 to move from the top barrier open position to the top barrier closed position when a level of granular material in the sub-sample measurement chamber 108 is greater than or equal to a predetermined level (e.g., the sub-sample measurement chamber 108 is full of granular material or a particular period of time has elapsed). The sub-sample of granular material stored in the sub-sample measurement chamber 108 may have a known volume. For example, the sub-sample of granular material may have a volume equal to a capacity of the sub-sample measurement chamber 108.

The separator actuator 118 may then separate the sub-sample measurement chamber 108 from the holding hopper 102 and/or the top barrier assembly to eliminate or reduce potential mechanical interference from the holding hopper 102 and/or the top barrier 120 that may affect measurement of the sub-sample of granular material in the sub-sample measurement chamber 108.

One or more measurement sensors of the grain measurement apparatus 100 may simultaneously measure one or more attributes of granular material in the holding hopper 102 and/or the sub-sample measurement chamber 108, which may improve a measurement speed and reduce a corresponding measurement time compared to measuring each attribute one by one. For example, the hopper force measurement sensors 104 may measure a total weight of an overall assembly that includes the holding hopper 102 and the sub-sample measurement chamber 108, and may generate a signal related to and/or indicative of the total weight of the overall assembly. A DSP module coupled to the hopper force measurement sensors 104 (e.g., the DSP module 410 of FIG. 4) may read the signal from the hopper force measurement sensors 104 to determine the total weight of the overall assembly.

Simultaneously, the chamber force measurement sensor 114 may measure a weight of the sub-sample measurement chamber 108 and may generate a signal related to and/or indicative of the weight of the sub-sample measurement chamber 108. The DSP module may read the signal from the sub-sample measurement chamber 108 to determine the weight of the sub-sample measurement chamber 108. The DSP module may determine a net weight of granular material held in the sub-sample measurement chamber 108 by subtracting a tare weight of the sub-sample measurement chamber 108 from the measured weight of the sub-sample measurement chamber 108. If desired, the DSP module may also determine a weight of granular material in the holding hopper 102 by subtracting (1) the total tare weight of the overall assembly and (2) the net weight of granular material held in the sub-sample measurement chamber 108 from the total weight of the overall assembly.

Simultaneously, the moisture sensor 162 may measure a moisture level in the sub-sample measurement chamber 108 and may generate a signal related to and/or indicative of the moisture level. The DSP module may read the signal from the moisture sensor 162 to determine the moisture level in the sub-sample of granular material.

Simultaneously, the DSP module may read signals generated by an acceleration measurement device (e.g., one or more reference force measurement sensors and/or an accelerometer) to determine an acceleration of a dynamic platform upon which the grain measurement apparatus 100 is mounted.

In some embodiments, the DSP module may continually read signals from the one or more measurement sensors. For example, the DSP module may continually sample low-pass filtered analog signals from the chamber force measurement sensor 114, the hopper force measurement sensors 104, the moisture sensor 162, the one or more reference force measurement sensors, and/or the accelerometer at a synchronized sample rate (e.g., a sample rate in the neighborhood of one kilohertz). The DSP module may use time-sliced windows of low-pass (anti-alias) filtered kilohertz-rate samples to provide weight measurements with motion and slope compensation. The DSP module may use the signals received from the one or more measurement sensors to determine: (1) one or more values for one or more attributes of the sub-sample in the sub-sample measurement chamber 108; and/or (2) one or more values for one or more attributes of the sample of granular material in the holding hopper 102. The DSP module is described below in more detail with reference to FIGS. 4-5.

When measurements of one or more attributes for the sub-sample in the sub-sample measurement chamber 108 and/or the sample in the holding hopper 102 complete, the top barrier 120, the bottom barrier 112, and/or the bypass barrier 152 may be opened to dispose the granular material while the measurement data is transmitted to an external computer. The bypass barrier 152 may be opened to speed up the evacuation of the holding hopper 102, such that the remaining granular material in the holding hopper 102 does not need to pass through the sub-sample measurement chamber 108 for evacuation. In some embodiments, when the hopper force measurement sensors 104 indicate that the holding hopper 102 is back to the tare weight, all barriers 152, 120, and 112 may be closed. Alternatively, if a period of time configured by a user or a manufacturer has elapsed, all barriers 152, 120, and 112 may be closed. The separator actuator 118 may dock the sub-sample measurement chamber 108 back to the holding hopper 102 and/or the top barrier assembly. The grain measurement apparatus 100 may be ready to accept a next sample for measurement.

Alternatively, when measurements of one or more attributes for the sub-sample of granular material in the sub-sample measurement chamber 108 complete, the bottom barrier 112 may be opened to dispose the granular material from the sub-sample measurement chamber 108. When the chamber force measurement sensor 114 indicates that the sub-sample measurement chamber 108 is back to the tare weight, the bottom barrier 112 may be closed. Alternatively, if a period of time configured by a user or a manufacturer has elapsed, the bottom barrier 112 may be closed. The separator actuator 118 may dock the sub-sample measurement chamber 108 back to the holding hopper 102 and/or the top barrier assembly. The sub-sample measurement chamber 108 may be ready to accept a next sub-sample for measurement. For example, the top barrier 120 may be opened to allow a next sub-sample of granular material to flow from the holding hopper 102 to the sub-sample measurement chamber 108 for measurement. In this case, for a same sample of granular material in the holding hopper 102, multiple sub-samples of the granular material may be measured in the sub-sample measurement chamber 108. An average of the measurements from the multiple sub-samples may be obtained.

Figure 2A:
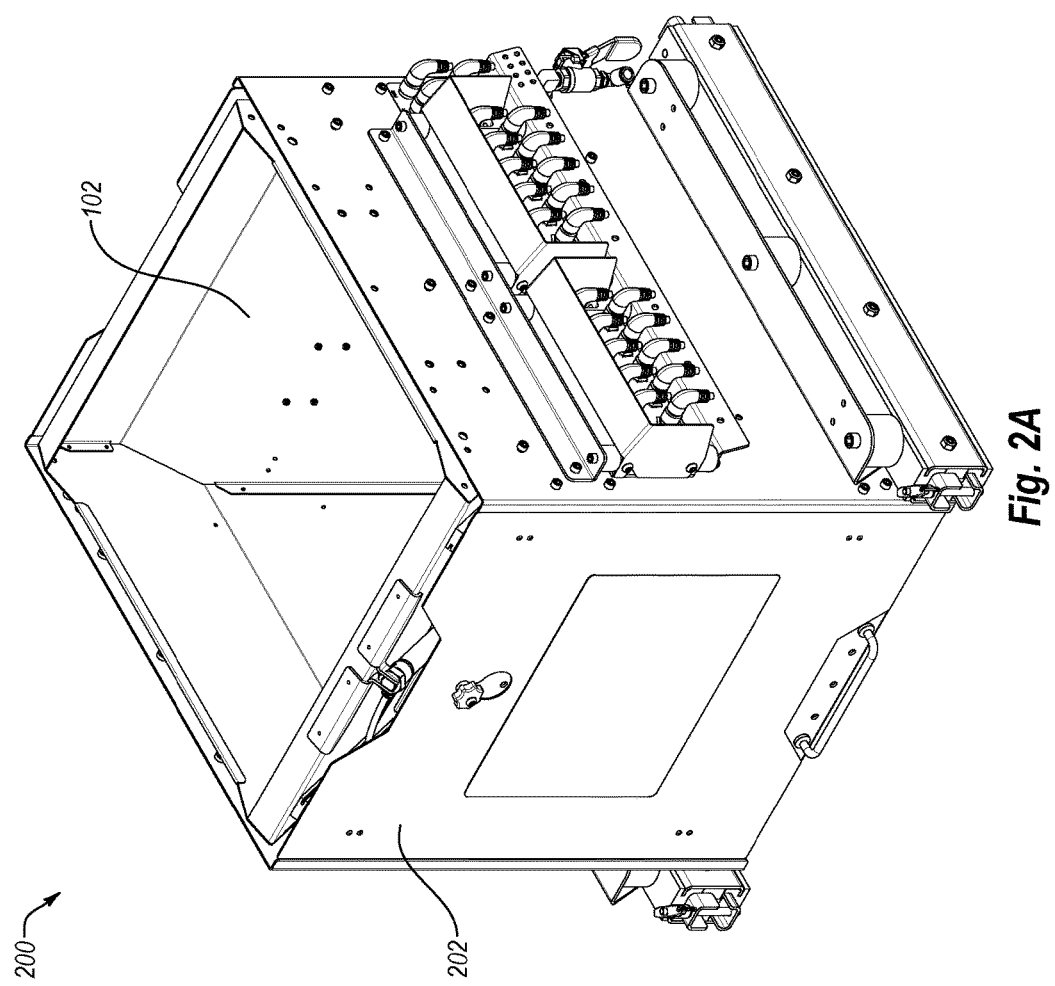
FIG. 2A is a perspective view of the example grain measurement apparatus of FIG. 1A placed in an example outer housing.

FIG. 2A is a perspective view 200 of the example grain measurement apparatus 100 of FIG. 1A placed in an example outer housing 202, arranged in accordance with at least some embodiments described herein. The perspective view 200 illustrates the outer housing 202 and the holding hopper 102 of the grain measurement apparatus 100.

FIG. 2B is a cross-sectional view 250 of the example grain measurement apparatus 100 of FIG. 1A placed in the example outer housing 202 of FIG. 2A, arranged in accordance with at least some embodiments described herein. The cross-sectional view 250 illustrates the outer housing 202, the holding hopper 102, the moisture sensor 162, and the sub-sample measurement chamber 108 of the grain measurement apparatus 100.

Figure 3A:
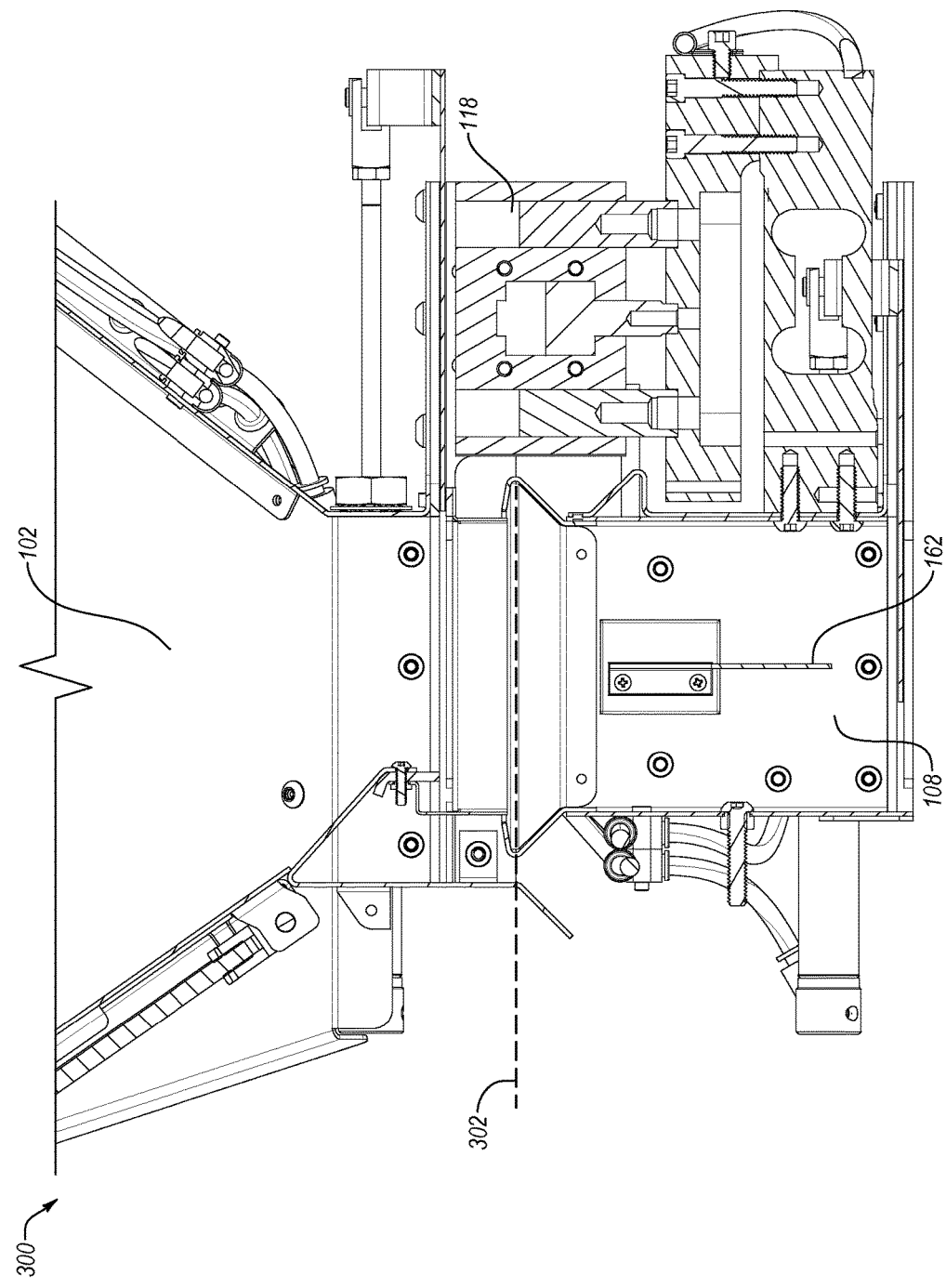
FIG. 3A is a partial cross-sectional view of the example grain measurement apparatus of FIG. 1A, where a sub-sample measurement chamber of the example grain measurement apparatus is separated from a holding hopper and a top barrier assembly of the grain measurement apparatus.

FIG. 3A is a partial cross-sectional view 300 of the example grain measurement apparatus 100 of FIG. 1A, arranged in accordance with at least some embodiments described herein. In FIG. 3A, the sub-sample measurement chamber 108 is in an undocked position in which the sub-sample measurement chamber 108 is separated from the holding hopper 102 and/or the top barrier assembly of the grain measurement apparatus 100 by the separator actuator 118. While separating the sub-sample measurement chamber 108 from the holding hopper 102, the separator actuator 118 may also actuate the chamber force measurement sensor 114 and the sensor frame 116 to move together with the sub-sample measurement chamber 108. For example, the separator actuator 118 may move the sub-sample measurement chamber 108, the chamber force measurement sensor 114, and the sensor frame 116 downwards to separate them from the holding hopper 102 and the top barrier assembly. In another example, the separator actuator 118 may move the holding hopper 102 and the top barrier assembly upwards to separate them from the sub-sample measurement chamber 108, the chamber force measurement sensor 114, and the sensor frame 116.

If the sub-sample measurement chamber 108 is filled with a sub-sample of granular material, a dashed line 302 may indicate a level of the granular material in the sub-sample measurement chamber 108 while the sub-sample measurement chamber 108 is separated (e.g., undocked) from the holding hopper 102.

FIG. 3B is another partial cross-sectional view 350 of the example grain measurement apparatus 100 of FIG. 1A, arranged in accordance with at least some embodiments described herein. In FIG. 3B, the sub-sample measurement chamber 108 is docked to the holding hopper 102 and the top barrier assembly by the separator actuator 118. While docking the sub-sample measurement chamber 108 to the holding hopper 102, the separator actuator 118 may also actuate the chamber force measurement sensor 114 and the sensor frame 116 to move together with the sub-sample measurement chamber 108. For example, the separator actuator 118 may move the sub-sample measurement chamber 108, the chamber force measurement sensor 114, and the sensor frame 116 upwards so that the sub-sample measurement chamber 108 is docked to the holding hopper 102 and the top barrier assembly. In another example, the separator actuator 118 may move the holding hopper 102 and the top barrier assembly downwards so that the sub-sample measurement chamber 108 is docked to the holding hopper 102 and the top barrier assembly.

If the sub-sample measurement chamber 108 is filled with a sub-sample of granular material, a dashed line 352 indicates a level of the granular material in the sub-sample measurement chamber 108 while the sub-sample measurement chamber 108 is docked to the holding hopper 102.

FIG. 4 is a block diagram of an example operating environment 400 that includes a grain measurement apparatus 402 and the DSP module 410, arranged in accordance with at least some embodiments described herein. In some embodiments, the DSP module 410 may be included in and/or mounted on the grain measurement apparatus 402. Alternatively, the DSP module 410 may be an external module coupled to the grain measurement apparatus 402. In these and other implementations, the DSP module 410 may be communicatively coupled to, e.g., the hopper force measurement sensors 104, the chamber force measurement sensor 114, the moisture sensor 162, the accelerometer, and/or other sensors to receive or sample signals therefrom.

In some embodiments, the grain measurement apparatus 402 may be the same as or similar to the grain measurement apparatus 100 of FIG. 1A. The grain measurement apparatus 402 may include a holding hopper 403, a sub-sample measurement chamber 405, one or more measurement sensors 404a . . . 404n (referred to individually or collectively as measurement sensor 404 or measurement sensors 404), and any other components suitable for a grain measurement apparatus. The holding hopper 403 may be the same as or similar to the holding hopper 102 of FIG. 1A. The sub-sample measurement chamber 405 may be the same as or similar to the sub-sample measurement chamber 108 of FIG. 1A. The measurement sensors 404 may be the same as or similar to the hopper force measurement sensors 104, the chamber force measurement sensor 114, the moisture sensor 162, the accelerometer, and/or other sensors discussed above.

The DSP module 410 may include a processor 412, a storage medium 414, and/or any other suitable components for a DSP unit. The processor 412 may be of any type including, but not limited to, a central processing unit (CPU), a microprocessor (μP), a microcontroller (μC), a digital signal processor (DSP), or any combination thereof. The processor 412 may be configured to execute computer instructions that, when executed, cause the processor 412 to perform or control performance of one or more of the operations described herein with respect to the DSP module 410.

The storage medium 414 may include volatile memory such as random access memory (RAM), persistent or non-volatile storage including, but not limited to, read only memory (ROM), electrically erasable and programmable ROM (EEPROM), compact disc-ROM (CD-ROM) or other optical disk storage, magnetic disk storage or other magnetic storage device, NAND flash memory or other solid state storage device, or other persistent or non-volatile computer storage medium. Accordingly, the storage medium 414 may include a non-transitory computer-readable medium. The storage medium 414 may store computer instructions that may be executed by the processor 412 to perform or control performance of one or more of the operations described herein with respect to the DSP module 410. Alternately or additionally, the storage medium 414 may store data or data signals collected from the measurement sensors 404, data generated by processing the data or data signals collected from the measurement sensors 404, and/or other data.

In some embodiments, a total tare weight value of an overall assembly that includes the holding hopper 403 and the sub-sample measurement chamber 405 may be stored in the storage medium 414. The total tare weight value may be equal to a sum of a tare weight value of the holding hopper 403 and a tare weight value of the sub-sample measurement chamber 405. The storage medium 414 may also store the tare weight value of the sub-sample measurement chamber 405 and/or the tare weight value of the holding hopper 403.

The DSP module 410 may be communicatively coupled to the grain measurement apparatus 402. For example, the DSP module 410 may be communicatively coupled to the measurement sensors 404. The DSP module 410 may read signals outputted from the measurement sensors 404. The DSP module 410 may use the signals to determine: (1) one or more attributes of a sample of granular material held in the holding hopper 403; and/or (2) one or more attributes of a sub-sample of granular material held in the sub-sample measurement chamber 405. For example, the DSP module 410 may determine a weight value (e.g., a net weight value) of a sample of granular material in the holding hopper 403, a weight value (e.g., a net weight value) of a sub-sample of granular material in the sub-sample measurement chamber 405, a density of a plot, and/or any other suitable attributes as described herein.

For example, the measurement sensors 404 may include one or more hopper force measurement sensors that are similar to or the same as the hopper force measurement sensors 104 of FIG. 1A. The one or more hopper force measurement sensors may measure a total weight of the overall assembly that includes the holding hopper 403 and the sub-sample measurement chamber 405. The one or more hopper force measurement sensors may generate a signal related to and/or indicative of the total weight of the overall assembly. The DSP module 410 may read the signal from the hopper force measurement sensors and may determine a total weight value of the overall assembly from the signal. The DSP module 410 may calculate a weight value of granular material in the overall assembly by subtracting the total tare weight value of the overall assembly from the total weight value of the overall assembly.

Alternatively or additionally, the measurement sensors 404 may include a chamber force measurement sensor that is similar to or the same as the chamber force measurement sensor 114 of FIG. 1A. The chamber force measurement sensor may measure a weight of the sub-sample measurement chamber 405 and may generate a signal related to and/or indicative of the weight of the sub-sample measurement chamber 405. The DSP module 410 may read the signal from the chamber force measurement sensor and may determine a weight value of the sub-sample measurement chamber 405 from the signal. The DSP module 410 may calculate a net weight value of a sub-sample of granular material in the sub-sample measurement chamber 405 by subtracting the tare weight value of the sub-sample measurement chamber 405 from the weight value of the sub-sample measurement chamber 405. The DSP module 410 may calculate a density of a plot (e.g., kilograms/hectoliter, lbs/bushel) by dividing the net weight value of the sub-sample by a known volume of the sub-sample.

Alternatively or additionally, the DSP module 410 may determine a net weight value of granular material in the holding hopper 403 by subtracting from the total weight of the overall assembly: (1) the total tare weight of the overall assembly; and (2) the net weight value of granular material in the sub-sample measurement chamber 405 if there is any.

Alternatively or additionally, the one or more measurement sensors 404 may include a moisture sensor that is similar to or the same as the moisture sensor 162 of FIG. 1E. The moisture sensor may measure a moisture level of the sub-sample of granular material in the sub-sample measurement chamber 405 and may generate a signal related to the moisture level. The DSP module 410 may read the signal from the moisture sensor and may use the signal to determine a value for the moisture level in the sub-sample of granular material.

Alternatively or additionally, the one or more measurement sensors 404 may include a level sensor disposed within the holding hopper 403. The level sensor may measure a level of granular material in the holding hopper 403 and may generate a signal related to the level of granular material. The DSP module 410 may read the signal from the level sensor and may use the signal to determine a value for the level of granular material in the holding hopper 403 or remaining in the holding hopper 403.

Alternatively or additionally, the one or more measurement sensors 404 may include one or more reference force measurement sensors each loaded with a known weight. The DSP module 410 may determine an acceleration based on one or more signals generated by the one or more reference force measurement sensors. The acceleration may include an acceleration of a dynamic platform upon which the grain measurement apparatus 402 is mounted. The DSP module 410 may improve accuracy of weight measurements (e.g., the total weight of the overall assembly that includes the holding hopper 403 and the sub-sample measurement chamber 405, the weight of the holding hopper 403, and/or the weight of the sub-sample measurement chamber 405) by adjusting or compensating measured weight values according to the acceleration.

Alternatively or additionally, the one or more measurement sensors 404 may include an accelerometer configured to measure the acceleration. The DSP module 410 may determine the acceleration based on a signal generated by the accelerometer. The DSP module 410 may improve accuracy of weight measurements by adjusting measured weight values according to the acceleration measurements.

Alternatively or additionally, the one or more measurement sensors 404 may include a near infrared radiation spectrometer (NIRS) sensor in the sub-sample measurement chamber 405 so that one or more attributes such as protein, oil, etc., may be measured by the DSP module 410 using the NIRS sensor.

Figure 5:
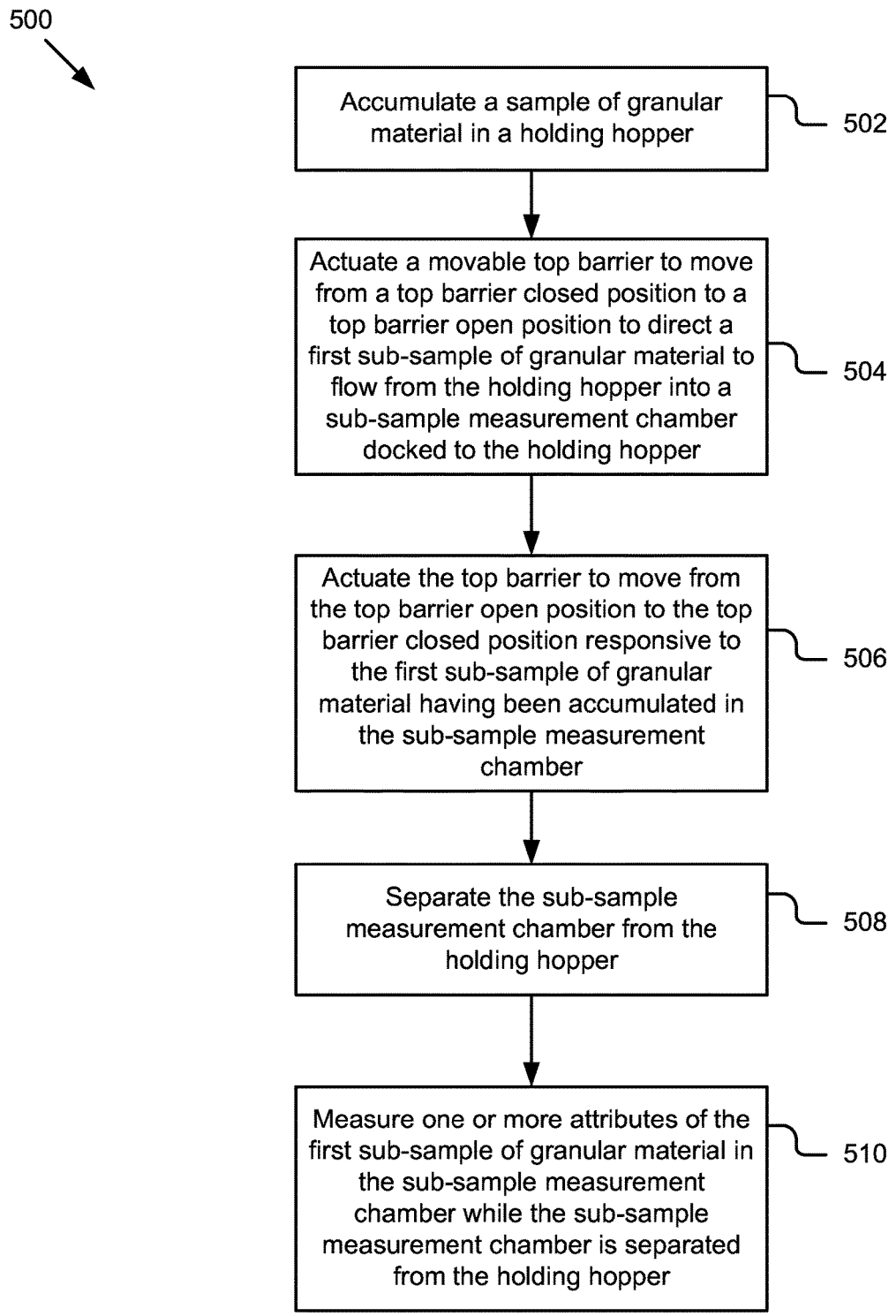
FIG. 5 is a flow diagram of an example method of measuring one or more attributes of granular material.

FIG. 5 is a flow diagram of an example method 500 of measuring granular material, arranged in accordance with at least some embodiments described herein. The method 500 may be performed in whole or in part by, e.g., a grain measurement apparatus (e.g., the grain measurement apparatus 100 of FIG. 1A or the grain measurement apparatus 402 of FIG. 4) and/or a DSP module (e.g., the DSP module 410 of FIG. 4). Although illustrated as discrete blocks, various blocks may be divided into additional blocks, combined into fewer blocks, or eliminated, depending on the desired implementation.

The method 500 may begin at block 502 in which a sample of granular material may be accumulated in a holding hopper of the grain measurement apparatus.

At block 504, a movable top barrier of the grain measurement apparatus may be actuated by a top barrier actuator (e.g., the top barrier actuator 106 of FIG. 1A) to move from a top barrier closed position to a top barrier open position to direct a first sub-sample of granular material to flow from the holding hopper into a sub-sample measurement chamber of the grain measurement apparatus. The sub-sample measurement chamber may be docked to the holding hopper. In these and other implementations, the sub-sample measurement chamber may be selectively docked to and undocked from the holding hopper as described herein.

At block 506, the top barrier may be actuated to move from the top barrier open position to the top barrier closed position responsive to the first sub-sample of granular material having been accumulated in the sub-sample measurement chamber.

At block 508, the sub-sample measurement chamber may be separated from the holding hopper. Separating the sub-sample measurement chamber from the holding hopper may include moving the sub-sample measurement chamber from a docked position to an undocked position, such as from the docked position of FIG. 3B to the undocked position of FIG. 3A.

At block 510, one or more attributes of the first sub-sample of granular material in the sub-sample measurement chamber may be measured while the sub-sample measurement chamber is separated from the holding hopper. For example, one or more measurement sensors (e.g., the chamber force measurement sensor 114, the moisture sensor 162, an accelerometer, one or more reference force measurement sensors, and/or any other suitable sensors) may measure one or more attributes of the first sub-sample of granular material and may generate one or more signals related to and/or indicative of the one or more attributes of the first sub-sample of granular material. The DSP module (e.g., the DSP module 410 of FIG. 4) may determine one or more values for the one or more attributes based on the one or more signals from the one or more measurement sensors, as described above with reference to FIG. 4. In some embodiments, measurement of the one or more attributes may be performed simultaneously.

Alternatively or additionally, the method 500 may include using one or more measurement sensors (e.g., the hopper force measurement sensors 104, a level sensor, the accelerometer, the one or more reference force measurement sensors, and/or any other suitable sensors) to measure one or more attributes of the sample of granular material in the holding hopper and may generate one or more signals related to and/or indicative of the one or more attributes of the sample of granular material. The DSP module may determine one or more values for the one or more attributes based on the one or more signals from the one or more measurement sensors, as described above with reference to FIG. 4.

In some embodiments, after the first sub-sample of granular material is measured, all barriers may be opened. Both the holding hopper and the sub-sample measurement chamber may be evacuated in a high speed mode. For example, the method 500 may include, responsive to a completion of measurement of the first sub-sample of granular material, (1) actuating a bottom barrier to move from a bottom barrier closed position to a bottom barrier open position to evacuate the first sub-sample of granular material from the sub-sample measurement chamber, (2) moving the top barrier from the top barrier closed position to the top barrier open position to allow evacuation of granular material from the holding hopper, and/or (3) moving a bypass barrier coupled to the holding hopper from a bypass closed position to a bypass open position to evacuate remaining granular material in the holding hopper. The bypass barrier may be opened to speed up evacuation of the granular material from the holding hopper.

Alternatively, measurement variability throughout the entire sample of granular material may be obtained by batching the entire sample (or a substantial portion of the entire sample) of granular material through the sub-sample measurement chamber. More than one sub-sample of granular material may be directed to and measured in the sub-sample measurement chamber sequentially as long as there is sufficient granular material in the holding hopper to refill the sub-sample measurement chamber. These measurements from different sub-samples may be recorded, averaged, and/or analyzed to provide measurements of an entire plot.

For example, the method 500 may additionally include actuating the bottom barrier to move from the bottom closed position to the bottom open position to evacuate the first sub-sample of granular material from the sub-sample measurement chamber responsive to a completion of measurement of the first sub-sample. Next, the method 500 may include actuating the bottom barrier to move from the bottom barrier open position to the bottom barrier closed position responsive to the first sub-sample of granular material having been evacuated from the sub-sample measurement chamber, a particular period of time having elapsed, or a weight value of the sub-sample measurement chamber being approximately equal to a tare weight value of the sub-sample measurement chamber. The method 500 may additionally include (1) docking the sub-sample measurement chamber back to the holding hopper, (2) actuating the top barrier to move from the top barrier closed position to the top barrier open position again to direct a second sub-sample of granular material to flow from the holding hopper into the sub-sample measurement chamber, (3) actuating the top barrier to move from the top barrier open position to the top barrier closed position responsive to the second sub-sample of granular material having been accumulated in the sub-sample measurement chamber, (4) separating the sub-sample measurement chamber from the holding hopper, and (5) measuring one or more attributes of the second sub-sample of granular material in the sub-sample measurement chamber and/or one or more attributes of the remaining sample of granular material in the holding hopper while the sub-sample measurement chamber is separated from the holding hopper. By repeating similar operations, the method 500 may continue to measure multiple sub-samples of granular material in the same plot.

Measurements from multiple sub-samples of granular material from the same plot may be averaged to improve accuracy. For example, a density of the plot and/or a moisture level of the granular material may be determined as an average of densities and/or an average of moisture levels from the multiple sub-samples. In some embodiments, the method 500 may skip or bypass measurements of a first sub-sample of granular material to eliminate or reduce possible carryover effects from a previous plot. The carryover effects may refer to contamination caused by residual material from the previous plot that may affect measurement of a current plot. The residual material from the previous plot may be a result of incomplete combine cleanout or other contamination. The method 500 may record measurements starting from a second, third, or other subsequent sub-sample of granular material.

In some embodiments, the method 500 may include using a density measurement to adjust a reading of the moisture sensor up or down slightly. The density measurement may be used to compensate the moisture measurement.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

The present disclosure is not to be limited in terms of the particular embodiments described herein, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that the present disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A measurement apparatus configured to measure samples of granular material, the measurement apparatus comprising:

a holding hopper configured to receive and hold a sample of granular material;

a top barrier assembly coupled between the holding hopper and a sub-sample measurement chamber, the top barrier assembly including a movable top barrier configured to be moved from a top barrier closed position to a top barrier open position to direct a sub-sample of granular material to flow from the holding hopper to the sub-sample measurement chamber;

the sub-sample measurement chamber coupled to the holding hopper and the top barrier assembly at a docked position to receive the sub-sample of granular material from the holding hopper;

a separator actuator configured to separate the sub-sample measurement chamber from the holding hopper and the top barrier assembly to an undocked position that is different than the docked position and in which the sub-sample measurement chamber is separated from the holding hopper and the top barrier assembly and contains the sub-sample of granular material; and one or more measurement sensors configured to measure one or more attributes of the sub-sample of granular material and generate one or more signals related to the one or more attributes of the sub-sample of granular material responsive to the sub-sample measurement chamber being separated from the holding hopper and the top barrier assembly, wherein the one or more attributes of the sub-sample of granular material includes at least one of a weight, a density, a moisture level, a protein level, and a spectra of the sub-sample of granular material.

2. The measurement apparatus of claim 1, further comprising a digital signal processing module configured to receive the one or more signals from the one or more measurement sensors, the digital signal processing module configured to determine one or more values for the one or more attributes of the sub-sample of granular material based on the one or more signals.

3. The measurement apparatus of claim 2, wherein:
the one or more measurement sensors include a first force measurement sensor configured to weigh the sub-sample measurement chamber and generate a first signal related to a weight of the sub-sample measurement chamber, the first signal being included in the one or more signals related to the one or more attributes of the sub-sample of granular material; and
the digital signal processing module is configured to determine a weight of the sub-sample of the granular material based on the first signal.

4. The measurement apparatus of claim 2, wherein:
the measurement apparatus is mounted on a dynamic platform;
the measurement apparatus further comprises an acceleration measurement device configured to measure an acceleration related to the dynamic platform; and
the digital signal processing module is further configured to correct a first measurement error related to a weight of the sub-sample of granular material and a second measurement error related to a weight of the sample of granular material based on the acceleration, wherein the first measurement error and the second measurement error are caused by at least one of motion, tilting, and vibration of the dynamic platform.

5. The measurement apparatus of claim 4, wherein the acceleration measurement device includes one or more reference force measurement sensors each loaded with a known weight.

6. The measurement apparatus of claim 4, wherein the acceleration measurement device includes an accelerometer configured to measure the acceleration.

7. The measurement apparatus of claim 2, wherein the one or more measurement sensors include a moisture sensor disposed within the sub-sample measurement chamber, the moisture sensor configured to generate a second signal responsive to an amount of moisture in the sub-sample of granular material, the second signal being included in the one or more signals related to the one or more attributes of the sub-sample of granular material.

8. The measurement apparatus of claim 7, wherein the digital signal processing module is configured to determine a moisture level in the sub-sample of granular material based on the second signal.

9. The measurement apparatus of claim 1, further comprising a first force measurement sensor disposed on one side of the holding hopper and a second force measurement sensor disposed on another side of the holding hopper, wherein the first force measurement sensor and the second force measurement sensor are configured to measure a total weight of an overall assembly that includes the holding hopper and the sub-sample measurement chamber.

10. The measurement apparatus of claim 1, wherein the holding hopper includes a level sensor configured to measure a level of the sample of granular material held in the holding hopper.

11. The measurement apparatus of claim 1, wherein:
the top barrier assembly further includes a top barrier actuator;
the top barrier actuator is configured to actuate the top barrier to move from the top barrier closed position to the top barrier open position responsive to a first triggering event; and
the top barrier actuator is further configured to actuate the top barrier to move from the top barrier open position to the top barrier closed position responsive to a second triggering event.

12. The measurement apparatus of claim 11, wherein:
the first triggering event includes at least one of:
a level of the sample of granular material in the holding hopper satisfying a first level requirement; and
a weight of granular material in the holding hopper satisfying a first weight requirement; and
the second triggering event includes at least one of:
a level of the sub-sample of granular material in the sub-sample measurement chamber satisfying a second level requirement;
the sub-sample measurement chamber being full of granular material;
a particular period of time having elapsed;
a weight of the sub-sample measurement chamber satisfying a second weight requirement; and
a measurement from a moisture sensor in the sub-sample measurement chamber satisfying a moisture requirement.

13. The measurement apparatus of claim 1, wherein the separator actuator is configured to separate the sub-sample measurement chamber from the holding hopper and the barrier assembly responsive to a triggering event that includes at least one of:
a level of the sub-sample of granular material in the sub-sample measurement chamber satisfying a level requirement; and
the top barrier being moved from the top barrier open position to the top barrier closed position.

14. The measurement apparatus of claim 1, wherein the one or more attributes of the sub-sample of granular material include multiple attributes of the sub-sample of granular material and wherein the multiple attributes of the sub-sample of granular material are measured simultaneously.

15. The measurement apparatus of claim 1, further comprising:
a bottom barrier coupled to the sub-sample measurement chamber, the bottom barrier being movable between a bottom closed position and a bottom open position; and
a bottom barrier actuator configured to actuate the bottom barrier to move from the bottom closed position to the bottom open position responsive to a completion of measurement of the sub-sample of granular material in the sub-sample measurement chamber, the bottom barrier configured to move to the bottom open position to evacuate the sub-sample of granular material from the sub-sample measurement chamber.

16. The measurement apparatus of claim 1, further comprising:
a bypass barrier coupled to the holding hopper, the bypass barrier being movable between a bypass closed position and a bypass open position,
wherein the bypass barrier is configured to move to the bypass open position to evacuate remaining granular material from the holding hopper responsive to at least one of:
a completion of measurement of the sub-sample of granular material in the sub-sample measurement chamber; and
a completion of measurement of the sample of granular material in the holding hopper.

17. The measurement apparatus of claim 1, wherein the sub-sample measurement chamber is disposed beneath the holding hopper.

18. The measurement apparatus of claim 1, further comprising
one or more hopper force measurement sensors configured to measure a total weight of an overall assembly responsive to the sub-sample measurement chamber being separated from the holding hopper and the top barrier assembly, the overall assembly including the holding hopper and the sub-sample measurement chamber; and
a digital signal processing module configured to determine a weight of the sample of the granular material by subtracting a total tare weight of the overall assembly from the total weight of the overall assembly.

19. A method of measuring samples of granular material, the method comprising:
accumulating a sample of granular material in a holding hopper;
actuating a movable top barrier to move from a top barrier closed position to a top barrier open position to direct a first sub-sample of granular material to flow from the holding hopper into a sub-sample measurement chamber docked to the holding hopper;
actuating the top barrier to move from the top barrier open position to the top barrier closed position responsive to the first sub-sample of granular material having been accumulated in the sub-sample measurement chamber;
separating the sub-sample measurement chamber from the holding hopper and the top barrier; and
measuring one or more attributes of the first sub-sample of granular material in the sub-sample measurement chamber while the sub-sample measurement chamber is separated from the holding hopper and the top barrier, wherein the one or more attributes of the first sub-sample of granular material includes at least one of a weight, a density, a moisture level, a protein level, and a spectra of the first sub-sample of granular material.

20. The method of claim 19, further comprising:
actuating a bottom barrier to move from a bottom closed position to a bottom open position to evacuate the first sub-sample of granular material from the sub-sample measurement chamber responsive to a completion of measurement of the first sub-sample of granular material;
actuating the bottom barrier to move from the bottom open position to the bottom closed position;
docking the sub-sample measurement chamber to the holding hopper;
actuating the top barrier to move from the top barrier closed position to the top barrier open position to direct a second sub-sample of granular material to flow from the holding hopper into the sub-sample measurement chamber;
actuating the top barrier to move from the top barrier open position to the top barrier closed position responsive to the second sub-sample of granular material having been accumulated in the sub-sample measurement chamber;
separating the sub-sample measurement chamber from the holding hopper and the movable barrier; and
measuring one or more attributes of the second sub-sample of granular material in the sub-sample measurement chamber while the sub-sample measurement chamber is separated from the holding hopper.

21. The method of claim 19, further comprising measuring a weight of the sample of granular material.

22. The method of claim 19, further comprising:
actuating a bottom barrier to move from a bottom barrier closed position to a bottom barrier open position to evacuate the first sub-sample of granular material from the sub-sample measurement chamber responsive to a completion of measurement of the first sub-sample of granular material; and
moving a bypass barrier coupled to the holding hopper from a bypass closed position to a bypass open position to evacuate remaining granular material in the holding hopper.

* * * * *